(12) United States Patent
Wu

(10) Patent No.: US 9,350,926 B2
(45) Date of Patent: May 24, 2016

(54) INFRARED NIGHT DRIVING ASSISTANT SYSTEM FOR A MOTOR VEHICLE

(71) Applicant: Guangzhou SAT Infrared Technology Co. Ltd., Guangdong (CN)

(72) Inventor: Jiping Wu, Guangdong (CN)

(73) Assignee: Guangzhou SAT Infrared Technology Co. Ltd., Guangdong (CN)

( * ) Notice: Subject to any disclaimer, the term of this patent is extended or adjusted under 35 U.S.C. 154(b) by 308 days.

(21) Appl. No.: 14/081,532

(22) Filed: Nov. 15, 2013

(65) Prior Publication Data

US 2014/0160290 A1 Jun. 12, 2014

(30) Foreign Application Priority Data

Dec. 11, 2012 (CN) .......................... 2012 1 0571106

(51) Int. Cl.
*H04N 5/33* (2006.01)
*H04N 5/232* (2006.01)
*B60R 1/00* (2006.01)
*H04N 5/225* (2006.01)

(52) U.S. Cl.
CPC .. *H04N 5/33* (2013.01); *B60R 1/00* (2013.01); *H04N 5/2252* (2013.01); *H04N 5/23216* (2013.01); *B60R 2300/106* (2013.01); *B60R 2300/40* (2013.01); *B60R 2300/8053* (2013.01)

(58) Field of Classification Search
CPC .................. B60R 2300/103; B60R 2300/106; B60R 2300/406; B60R 2300/207; B60R 2011/0057; B60R 2300/8033
See application file for complete search history.

(56) References Cited

U.S. PATENT DOCUMENTS

| | | | | |
|---|---|---|---|---|
| 2002/0126206 A1* | 9/2002 | Hunte | ....................... | B60R 1/00 348/148 |
| 2004/0143373 A1* | 7/2004 | Ennis | ....................... | B60R 1/00 701/1 |
| 2006/0098094 A1* | 5/2006 | Lott | .......................... | B60R 1/00 348/148 |
| 2008/0030311 A1* | 2/2008 | Dayan | ..................... | B60K 35/00 340/435 |
| 2008/0042812 A1* | 2/2008 | Dunsmoir | .......... | G06K 9/00805 340/435 |
| 2009/0195377 A1* | 8/2009 | Chang | ....................... | B60R 1/00 340/461 |
| 2010/0295945 A1* | 11/2010 | Plemons | ................... | B60R 1/00 348/148 |
| 2011/0267466 A1* | 11/2011 | Brester | ................... | B60R 11/04 348/148 |
| 2012/0062744 A1* | 3/2012 | Schofield | ................ | B60C 23/00 348/148 |
| 2012/0154591 A1* | 6/2012 | Baur | ......................... | B60R 1/00 348/148 |
| 2012/0173067 A1* | 7/2012 | Szczerba | ................ | G02B 27/01 701/23 |
| 2013/0033599 A1* | 2/2013 | Dayan | ..................... | B60K 35/00 348/148 |
| 2013/0076496 A1* | 3/2013 | Masuda | ................. | B60K 35/00 340/425.5 |
| 2014/0121883 A1* | 5/2014 | Shen | .................. | B62D 15/0285 701/28 |
| 2014/0139669 A1* | 5/2014 | Petrillo | ..................... | B60R 1/00 348/148 |

(Continued)

*Primary Examiner* — Jay Patel
*Assistant Examiner* — Neil Mikeska
(74) *Attorney, Agent, or Firm* — Stoel Rives LLP

(57) ABSTRACT

A night driving assistant system uses a tablet to wirelessly control an infrared camera in a motor vehicle. An infrared camera system is detachably fixed to the motor vehicle and captures the infrared thermal images of the road scene while the motor vehicle is moving and outputs the video signals of the captured infrared thermal images. A magnetic base is positioned under the chassis of the infrared camera system and attaches the infrared camera system to the motor vehicle. A tablet is detachably mounted inside the motor vehicle, connecting wirelessly with the infrared camera system and displaying video signals transmitted from the infrared camera system. By manipulating the tablet, functions can be realized such as operating the infrared camera system, recognizing a human/animal, triggering Global Positioning System (GPS) navigation, record/store/redisplay videos as well as processing multi-functions like split-screen display etc.

28 Claims, 11 Drawing Sheets

(56) References Cited

U.S. PATENT DOCUMENTS

| | | | | |
|---|---|---|---|---|
| 2014/0203629 A1* | 7/2014 | Hoffman | G01J 5/0022 | 307/9.1 |
| 2014/0340510 A1* | 11/2014 | Ihlenburg | H04N 7/18 | 348/118 |
| 2015/0181175 A1* | 6/2015 | Camilleri | B60R 1/00 | 348/148 |
| 2015/0208004 A1* | 7/2015 | Ruohonen | H04N 5/332 | 348/164 |
| 2015/0251602 A1* | 9/2015 | Baur | B60R 1/00 | 348/148 |

* cited by examiner

INFRARED NIGHT DRIVING ASSISTANT SYSTEM FOR A MOTOR VEHICLE

RELATED APPLICATION

The present application claims the benefit of foreign priority under 35 U.S.C. §119 based upon Chinese Application CN201210571106.8, filed on Dec. 11, 2012, the whole of which is hereby incorporated by reference herein.

TECHNICAL FIELD

The present disclosure relates to a vehicular infrared camera system and more particularly relates to a night driving assistant system using a tablet wirelessly controlling an infrared camera in a motor vehicle.

BRIEF DESCRIPTION OF THE DRAWINGS

In order that the disclosure may be more readily understood, and so that further features thereof may be appreciated, the disclosure will now be described, by way of example, with reference to the accompanying drawings, in which:

FIGS. 2A, 2B, and 2C are diagrams showing each part of the infrared camera system, wherein FIG. 2A illustrates the infrared camera alone, FIG. 2B illustrates a side view of the chassis, and FIG. 2C illustrates a bottom face of the chassis in one embodiment of the present disclosure;

DETAILED DESCRIPTION OF PREFERRED EMBODIMENTS

Figure 1:
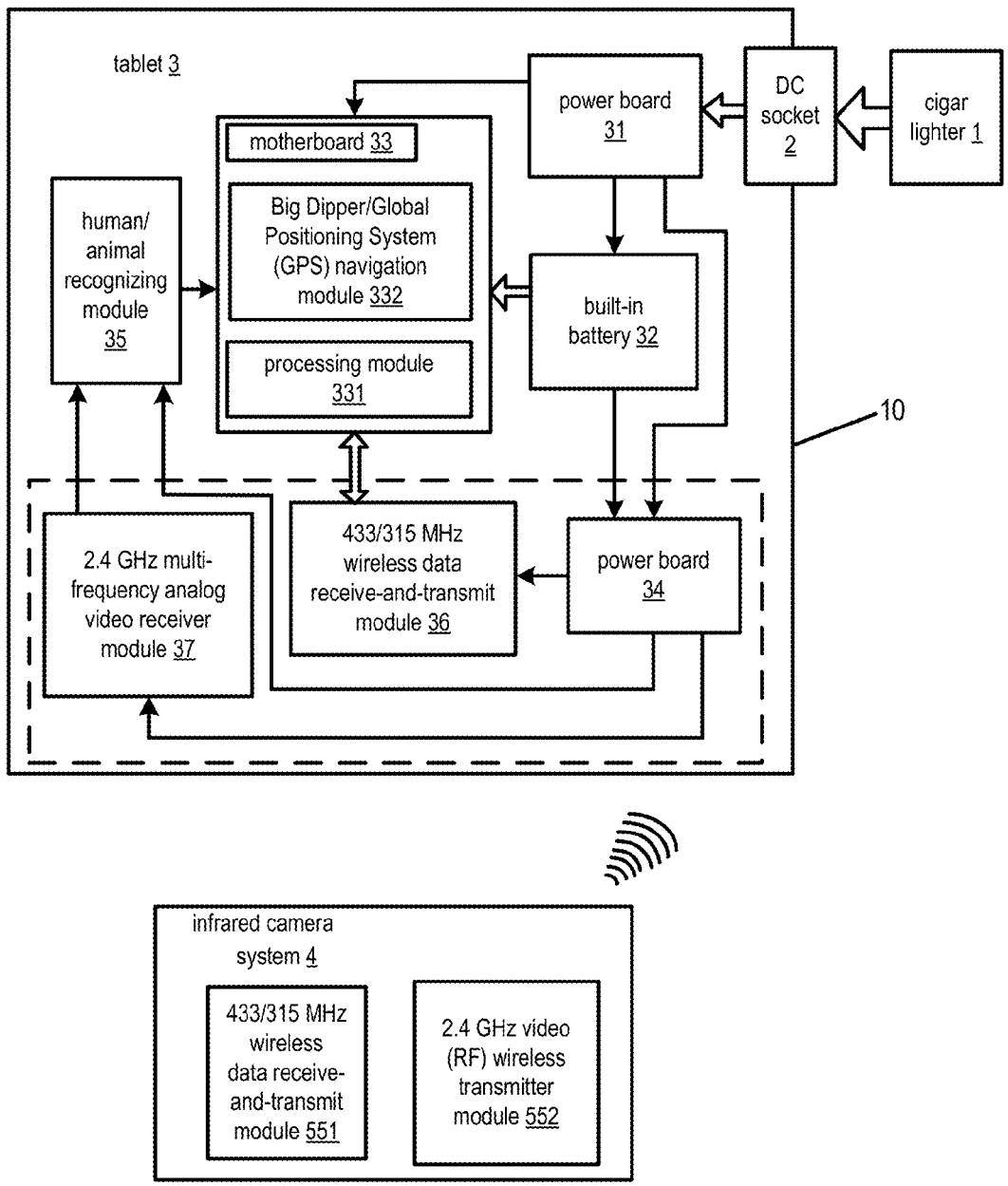
FIG. 1 is a block diagram showing a night driving assistant system wirelessly achieving communication between an infrared camera system and a tablet according to one embodiment of the present disclosure.

It has been proposed previously to provide a vehicular infrared night driving assistant system in which an infrared camera connects with a Liquid Crystal Display (LCD) by wires so as to alert the driver to avoid dangers in darkness or in other low-visibility conditions such as fog, heavy dust, or the like. With the help of infrared thermal images, human beings and animals can be avoided to enhance the safety coefficient while driving. However, the infrared camera and the LCD of previous systems are often fixed on or inside the motor vehicle such that they are not easy to be detached, which results in difficulty in repairing and maintaining them. Furthermore, the LCD of the conventional system only has a monotonous object of displaying infrared thermal images. It cannot be integrated with the Global Positioning System (GPS) navigation system, which, on the one hand, leads to inflexibility in operating the system and, on the other hand, to the easy distraction of the driver while he/she is driving, and to make otherwise avoidable accidents become more likely due to the complicated operation.

The present disclosure seeks to provide an improved night driving assistant system. According to one aspect of this disclosure, there is provided a night driving assistant system using a tablet wirelessly controlling an infrared camera in a motor vehicle. The tablet may include a tablet computer (e.g., iPad®), smartphone, laptop computer, or other mobile computing device. The night driving assistant system includes an infrared camera system detachably fixed to the motor vehicle through a magnetic base to instantaneously, or in real time, capture infrared thermal images of the road scene while the motor vehicle is moving and to instantaneously transmit the captured video signals of the infrared thermal images to a tablet so as to be presented on its touch screen of its Liquid Crystal Display (LCD). The system further comprising a magnetic base mounted to the chassis of the infrared camera system through screws, of which its rubber pad with magnets positioning the infrared camera system on the motor vehicle. The system further includes a tablet, as the system being configured, detachably installed inside the motor vehicle through an optional suction chuck cage or a skid mount. The tablet has built-in intelligence operating system and Global Positioning System (GPS) navigation system as well. The motor vehicular system, in use, features that the infrared camera wirelessly communicates with the tablet and that the touch screen of the LCD of the tablet displays current or real-time infrared thermal images, which recognize the human being/animal.

According to another aspect of this disclosure, there is provided a night driving assistant system, the infrared camera of this system is made up of a chassis including a housing, a left buckle and a right buckle, a M16 automatically locking lamp-equipped water-proof switch positioned to one side of the housing, which is able to singly control the power switch of the infrared camera. The housing of the chassis further includes a first bottom face, a slope cut face, and a second flat face.

The first bottom face provides a battery bracket and screw holes. The battery bracket holds a battery is which serves as a power source for the infrared camera system. The screw holes are used to connect tightly the chassis with the magnetic base through screws. The inside of the top end of the slope cut face contains two non-connected axes on both sides. The left axis is an M5 axis which connects with the housing of the chassis through the left buckle by screws. The M5 axis includes an M5 thin nut provided at the inside of the housing of the chassis. Screws tightly attach the housing of the chassis to the infrared camera.

A manual rotating mechanism is located on the M5 axis. With the M5 axis, the manual rotating mechanism can secure the infrared camera while it also enables the infrared camera rotate manually. The manual rotating mechanism includes a gasket next to the M5 thin nut and a wavy spring on the right of the gasket. The wavy spring can effectively secure a gear group so as to prevent the infrared camera from unfastening. The gear group is to the right of the wavy spring and includes a pair of identical gears. The left gear of the gear group connects with the chassis, while the right gear connects with the middle part of the seashell of the infrared camera. While the infrared camera is manually moved, the left and the right axes rotate, but while the infrared camera keeps stationary, the gear group serves as a securing mechanism.

The right axis is a hollow M8 thick axis, in which wires connect the core of the infrared camera with the battery unit. The infrared camera utilizes the M8 outside screw thread together with the right buckle to connect the core of the infrared camera and the chassis. The slope cut face has protruding lines on the top of both outside surfaces. The protruding lines facilitate the holding of the infrared camera because they enhance the friction of the surface. For example, a smooth surface easily enables the infrared camera to slip from the hands of a user.

In one embodiment of this disclosure, the infrared camera is fixed to the chassis to capture the infrared thermal images of the road scene while a motor vehicle is moving, and to wirelessly transmit the video signals to the tablet for displaying the video on the tablet's touch screen. At the same time, the infrared camera receives the wireless signals transmitted from the tablet in order to adjust the brightness and gain. The infrared camera is designed in streamline, akin to an elongated egg. The infrared camera also includes a shell mounted on the chassis. The shell has three parts including a top part, a middle part and a bottom part. The top part and the bottom part are respectively fixed onto the middle part through screws. The middle part is hollow and includes an integrated construction with the chassis.

The infrared camera includes an infrared camera core unit fixed to the front end of the middle part through screws. The infrared camera receives signals regarding brightness, gain, human being/animal recognition, and power status ("on"/"off" signals of the power) from the tablet and operates based on these signals. The camera transmits the current state of the core unit back to the tablet in order to present on its touch screen. The infrared camera includes a wireless receive-and-transmit unit positioned at the rear end of the middle part to achieve wireless communication with the tablet.

In one embodiment of this disclosure, the wireless receive-and-transmit unit includes a 433 MHz and/or 315 MHz (433/315 MHz) wireless data receive-and-transmit module that transforms the wireless signals transmitted from the tablet into serial port signals so as to have the infrared camera core unit receive and operate based on the signals. The camera transmits the current state of the core unit to the tablet through the 433/315 MHz wireless data receive-and-transmit module. A 2.4 GHz video radio frequency (RF) wireless transmitter module built into the infrared camera transforms the composite video broadcast signal (CVBS) analog signals into wireless video signals and transmits the wireless video signals to the 2.4 GHz multi-frequency analog video (RF) wireless receiver module.

The infrared camera core unit of this disclosure includes an operating module used to receive serial port signals transmitted from the 433/315 MHz wireless data receive-and-transmit module of the wireless receive-and-transmit unit, to execute instructions, to transmit the current state of the core to the 433/315 MHz wireless data receive-and-transmit module, and to present images on the touch screen of the tablet.

Alternatively the magnetic base is a Chinese patented magnetic base applied for by Guangzhou SAT Infrared Technology Co. Ltd. in 2008 with the patent number of ZL 2008 2 0110307.7.

In another embodiment of this disclosure, a motherboard is located within the tablet. The motherboard includes an intelligent operating system, can achieve the operation of the infrared camera core through the CPU of the motherboard, and also can achieve functions such as the adjustment of the brightness/gain of the infrared thermal images, turning on/off the recognition of human beings/animals, recording/storing/redisplaying the infrared video, and turning the power on/off as well as multi-function processing and the like.

The tablet includes a human/animal recognizing module positioned inside the tablet. The tablet receives the video signals of the infrared thermal images transmitted from the 2.4 GHz multi-frequency analog video (RF) wireless receiver module and processes the signals to mark the human beings/animals for presentation on the touch screen of the tablet. A 2.4 GHz multi-frequency analog video (RF) wireless receiver module is located inside the tablet; it receives the wireless video signals transmitted from the infrared camera and transforms the video signals into analog signals so as to address the interference problem between machines by using multiple frequency points.

A 433/315 MHz wireless data receive-and-transmit module is built inside the tablet to receive the wireless signals transmitted from the 433/315 MHz wireless data receive-and-transmit module of the infrared camera core unit and to transform the signals into serial port signals in order to transmit them to the motherboard. At the same time, the 433/315 MHz wireless data receive-and-transmit module built inside the tablet receives the serial port signals transmitted from the motherboard and transforms the signals into wireless signals in order to transmit them back to the 433/315 MHz wireless data receive-and-transmit module of the infrared camera core and, by this way, to achieve wireless communication between the tablet and the infrared camera.

In one embodiment, the tablet further includes a touch screen displaying the infrared thermal images. The touch screen is a high-resolution multi-touch capacitive touch screen.

In one embodiment, the touch screen includes an infrared control interface that enables users to achieve the object of operating the infrared camera core through touching the icons presented on the interface so as to record/store/redisplay video and to split the interface into two divided sections with one presenting the instantaneous road scene annotation navigation map and the other displaying the instantaneous infrared thermal images of the roadway.

In one embodiment, the infrared control interface includes a power switch icon using the intelligent operating system of the tablet to turn on the power when the icon is touched and to turn off the power when the red icon "X" on the top right corner of the touch screen is touched. The infrared control interface includes a record/store/redisplay icon located at the left lower corner of the touch screen. By touching the icon, a user of the tablet can instantaneously record the video and the annotation footage of the road scene while the vehicle is moving. When the icon is touched again, the mode enters into the procedure of storing. At any time, a user can touch the icon to repeat and listen to the recorded document in order to facilitate post-processing.

In one embodiment, the infrared control interface, through the intelligent operating system, can proportionately display the instantaneous road scene annotation navigation map and the instantaneous infrared thermal images of the road scene in the form of a split-screen.

In one embodiment, the infrared camera can be installed and uninstalled without any need to transform the vehicle.

In one embodiment, the tablet is selectively installed and removed, and the tablet can perform any of the functions a high-end tablet can achieve.

In one embodiment, the tablet further includes a Big Dipper or Global Positioning System (GPS) navigation module integrated into the motherboard, and displays, through the touch screen, the navigation map for Big Dipper/GPS. The Big Dipper/GPS map can be displayed in split-screen or in full screen. The Big Dipper navigation module may be configured to operate and interact with the Big Dipper navigation satellite system (also known as the BeiDou Navigation Satellite System), while the GPS navigation module may be configured to operate and interact with GPS satellites.

The foregoing and other objects, aspects, and advantages of the present application will become more apparent from the following detailed description of the embodiments in the present application taken in conjunction with the preferred embodiments and accompanying drawings. The embodiments herein are only used to illustrate but not to limit the present application.

With the increasing prevalence of the motor vehicle such as automobiles, a driver's ability, particularly in low-level of visibility weather such as at night or in fog, dust etc., of recognizing pedestrians and animals depending on the conventional visible lamps of the vehicle may not meet the requirement of safe driving. Devices like infrared cameras, due to their quality of not being obstructed by darkness or adverse weather, can, if equipped on the vehicle, ensure that safe driving behavior is rendered possible.

Conventionally, an undetachable infrared camera is positioned on the motor vehicle, making repair or adjustment difficult. Furthermore, the infrared camera often connects with an LCD or other screen through wires, and this further confines both the infrared camera and the LCD to where they are, thus bringing about the implication of inconvenience.

In addition, an LCD of an infrared camera system conventionally functions singly to perform the display of infrared images. A motor vehicle has to integrate other modern software such as the Big Dipper or Global Positioning System (GPS) navigation system to suffice the market.

In one embodiment of the present disclosure, a night driving assistant system uses a tablet for wirelessly controlling an infrared camera in a motor vehicle. While in use, the system provides a solution of wirelessly connecting the detachable infrared camera with the tablet which carries an intelligent operating system. The present disclosure not only takes advantage of portable instruments, but of all merits of a tablet device, thereby encompassing benefits of the functions of wireless infrared cameras and tablets. Such a system greatly facilitates the operation of a driver so as to increase the level of traffic safety.

Referring initially to FIG. 1 of the accompanying drawings, a night driving assistant system includes a tablet 3 with its touch screen 10 detachably positioned inside the motor vehicle. Electric current flows from the cigar lighter 1 to run through the DC socket 2, finally entering into the built-in power board 31 of the tablet 3. After changing voltage current, the electric current is divided and outputted respectively by said built-in power board 31 to a motherboard 33 and to a built-in battery 32 of the tablet 3. There is a third flow of electric current outputted to another power board 34 of the tablet 3. The power board 31 functions as a voltage stabilizer, in case the external power fluctuates to affect the operation of the tablet 3. The built-in battery 32 powers the tablet 3 under the condition of no external battery so as to guarantee the normal operation of the tablet 3.

The power board 34 provides power to a 433/315 MHz wireless data receive-and-transmit module 36 of the tablet 3, a 2.4 GHz multi-frequency analog video (RF) wireless receiver module 37, and a human being/animal recognizing module 35. The 2.4 GHz multi-frequency analog video (RF) wireless receiver module 37 receives the wireless video signals from the infrared camera system 4, and transforms the signals into analog video signals to output to the human being/animal recognizing module 35. The 2.4 GHz multi-frequency analog video (RF) wireless receiver module 37 addresses the problem of interference among devices through multiple frequency points. The human being/animal recognizing module 35 receives the analog video signals from the 2.4 GHz multi-frequency analog video (RF) wireless receiver module 37, converting them into digital video signals. With the human being recognizing function, the module 35 further transforms the digital video signals into analog video signals in order to transmit them to the processing module 331 to display on the touch screen 10 in the form of thermal infrared images. The 433/315 MHz wireless data receive-and-transmit module 36, located inside the tablet 3, receives the wireless signals from the 433/315 MHz wireless data receive-and-transmit module 551 of the infrared camera core unit 54, and converts the signals into serial port signals to transmit to the motherboard 33. At substantially the same time, the module 36 receives the serial port signals from the motherboard 33, and converts them into wireless signals to transmit to the module 551 of the infrared camera core unit 54, thus to realize the wireless communication between the tablet 3 and the infrared camera system 4. The motherboard 33 receives the instructions from the control interface 101 of the touch screen 10, which are processed by the processing module 331 in order to display on the control interface 101. The motherboard 33 further includes a Big Dipper/Global Positioning System (GPS) navigation module 332, and executes instructions relating to the Big Dipper/GPS system from the control interface. This is only one embodiment of the present disclosure. In another embodiment of the present disclosure, for instance, the motherboard may integrate a video storing module, an annotation module, etc. The infrared camera system 4 is detachably mounted on the motor vehicle. The infrared camera 5 includes a built in 433/315 MHz wireless data receive-and-transmit module 551. The module 551 transforms the wireless signals from the tablet 3 into serial port signals in order to transmit the signals to the infrared camera core unit 54 for execution and also to transmit the current state of the core to the tablet 3 through module 551. The 2.4 GHz video (RF) wireless transmitter module 552 transforms the CVBS analog signals into wireless video signals and transmits them to the 2.4 GHz multi-frequency analog video (RF) wireless receiver module 37 of the tablet 3, complementing the wireless communication between the infrared camera system 4 and the tablet 3.

Figure 2:
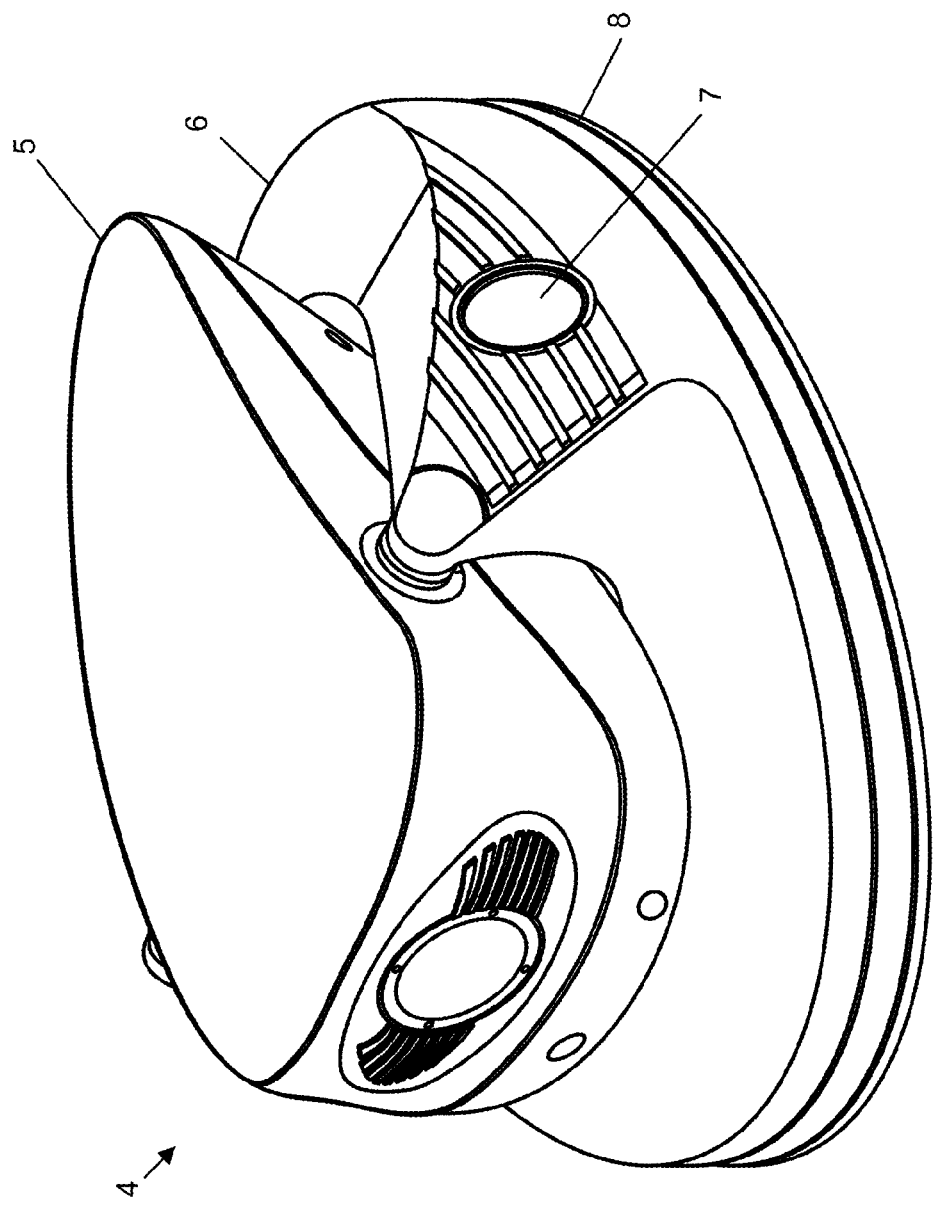
FIG. 2 illustrates an infrared camera system with a chassis and a magnetic base which is attached to the chassis in one embodiment of the disclosure.

With reference to FIG. 2, in one embodiment of the present disclosure, the infrared camera system 4 includes an infrared camera 5, a chassis 6 and a magnetic base 8. There is a power switch 7 is equipped on one side of the chassis 6.

Figure 2C:
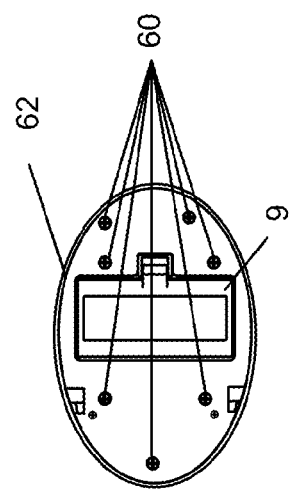
Figure 2B:
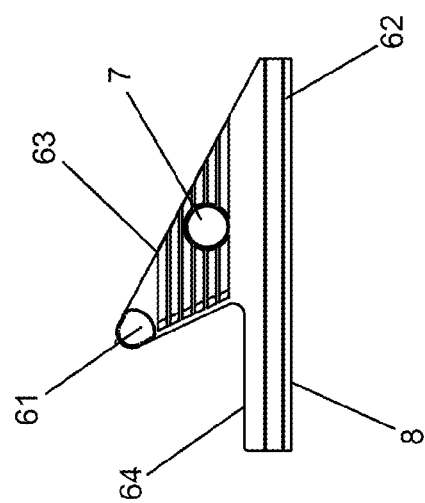
Figure 2A:
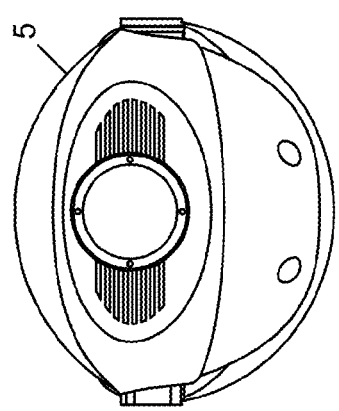

Referring now to FIGS. 2A-2C, in one embodiment of the present disclosure, these drawings respectively show the parts of the infrared camera system 4, namely, an infrared camera 5 (2A), a chassis 6 (2B) and the bottom view of the chassis 6 (2C).

Figure 3:
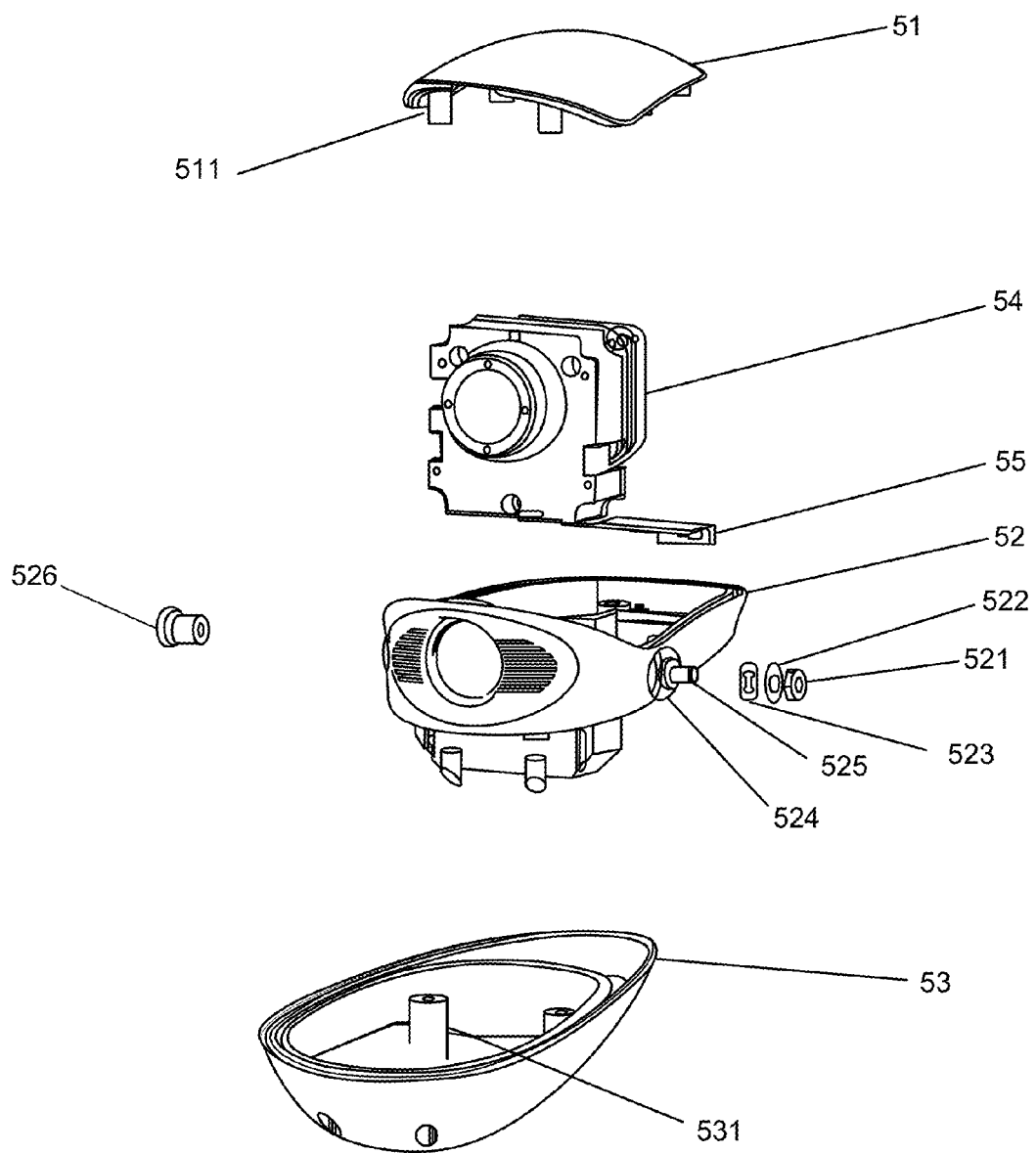
FIG. 3 is an exploded view of the infrared camera in one embodiment of the present disclosure.

FIG. 3 is an exploded schematic view of the infrared camera 5 of the present disclosure showing that the infrared camera 5 resembles an elongated egg with its streamlined appearance. The infrared camera 5 comprises a shell located on the chassis 6. The shell is divided into three parts, namely, the top part 51, the middle part 52, and the bottom part 53. The top and bottom parts 51, 53 are positioned on the middle part 52 through screw receiving members 511 and 531. The middle part 52 is hollow like a ship and includes a shape corresponding to the chassis 6. An infrared camera core unit 54 fixed on the frontal end of the middle part 52 by screws, receives and performs instructions from the tablet 3 such as setting brightness, gain, human being/animal recognition and power on/off, and simultaneously transmits the current state of the core back to the tablet 3. A wireless receive-and-transmit unit 55 jointed with the rear end of the middle part 52, realizes wireless communication between the infrared camera system 4 and the tablet 3.

Figures 3A, 4:
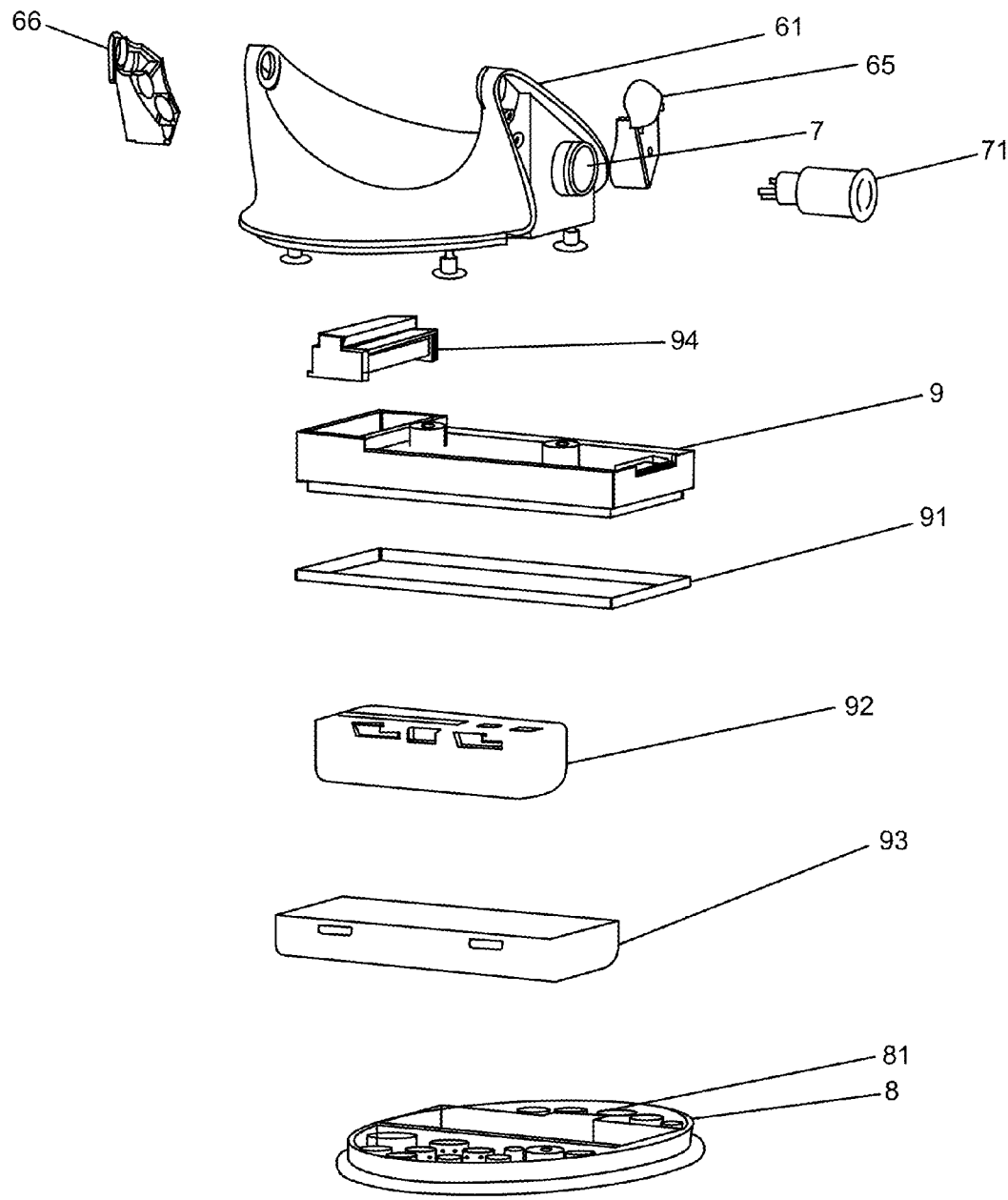
FIG. 3A is a diagram of a wireless receive-and-transmit unit of an infrared camera according to one embodiment of the present disclosure.
FIG. 4 is an exploded view of the chassis of an infrared camera system together with a diagram of an internal structure of a magnetic base according to one embodiment of the present disclosure.

FIG. 3A also shows the wireless receive-and-transmit unit 55.

Referring now to the combination of FIG. 4 and FIG. 3, together with FIGS. 2B and 2C, for one embodiment of the present disclosure, these drawings show the chassis 6 of the infrared camera system 4 and its manual rotating mechanism. The chassis 6 includes a housing 61, a left buckle 65, a right buckle 66, and a self-locking M16 lamp-equipped waterproof switch 71, which is connected to one side of the housing 61 and is able to singly control the power switch of the infrared camera 5. The housing 61 of the chassis 6 further includes a first bottom face 62, a slope cut face 63 and a second flat face 64. The first bottom face 62 provides a battery bracket 9 and screw holes 60 (seven shown). The battery bracket 9 is used to confine battery 92 to the battery compartment 93, fixed by a seal ring 91 for water and dust tightness. The battery 92 provides the infrared camera 4 with power through electrode 94. The screw holes 60 are used to fix the chassis 6 on the magnetic base 8 using screws.

On the top ends of the slope cut face 63, there are two axes coupled with inside walls using screws. The left axis 525 is an M5 axis which connects with the housing 61 of the chassis 6 through the left buckle 65 by screws. The M5 axis 525 includes an M5 thin nut 521 provided at the inside of the housing 61, and screws attach the housing 61 of the chassis 6 to the infrared camera system 4. A manual rotating mechanism is located on the M5 axis 525. With the M5 axis 525, the manual rotating mechanism can tightly secure the infrared camera 5 while it also enables the infrared camera 5 to rotate manually. The manual rotating mechanism includes a gasket 522 adjacent to the M5 thin nut 521, a wavy spring 523 on the right of the gasket 522, and a gear group 524. The wavy spring 523 can effectively secure the gear group 524 so as to prevent the infrared camera 5 from unfastening. The gear group 524 includes a pair of identical gears. The left gear of the gear group 524 connects with the chassis 6 while the right gear is connected with the middle part of the seal shell of the infrared camera 5. If the infrared camera 5 is manually moved, the left and right axes 525, 526 rotate. However, if the infrared camera 5 keeps stationary, the gear group 524 serves as a secure mechanism. A right axis 526 is a hollow M8 thick axis, in which wires, which connect the core of the infrared camera 5 with the battery bracket 9, are built in. The infrared camera 5 utilizes the M8 outside screw thread together with the right buckle 66 to connect the core unit 54 of the infrared camera 5 and the chassis 6. The slope cut face 63 has protruding lines on the top of both outside surfaces. These protruding lines or ridges facilitate the holding of the infrared camera system 4 because it enhances the friction of the surface, whereas a smooth surface may easily enable the infrared camera system 4 to slip from one's hands. The chassis 6 is used in conjunction with joints 81 of a specific magnetic base 8 in which magnets are fed to attach to the motor vehicle. The magnetic base 8 is patented under the Chinese patent number ZL 2008 20110307.7, and Guangzhou SAT Infrared Technology Co. Ltd. claims its ownership.

Figure 4A:
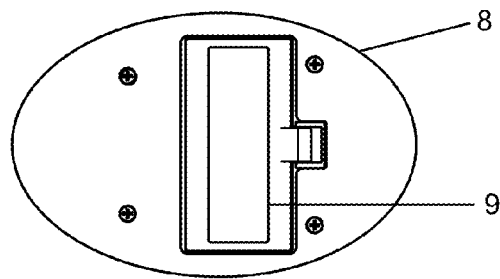
FIG. 4A is a diagram of a bottom view of the magnetic base from FIG. 4, according to one embodiment.

FIG. 4A illustrates a bottom view of the magnetic base from FIG. 4, according to one embodiment.

Figure 5:
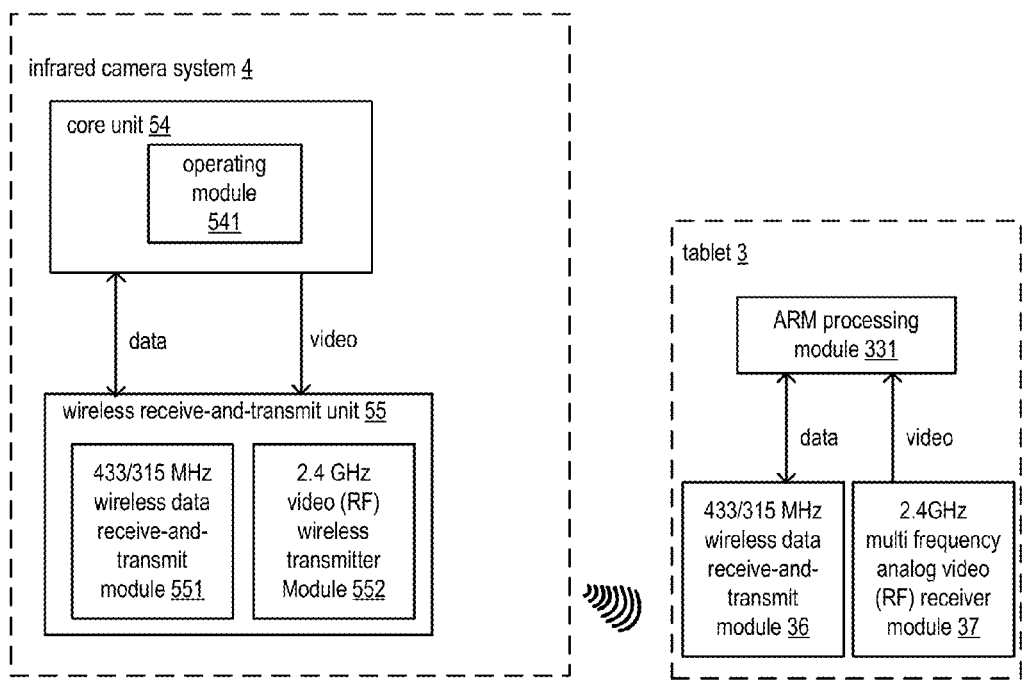
FIG. 5 is a block diagram showing an infrared camera wirelessly communicating with a tablet according to one embodiment of the present disclosure.

FIG. 5 is a schematic diagram showing how the infrared camera system 4 realizes wireless communication with the tablet 3. Instructions from the touch screen 10 of the tablet 3 are transmitted to the infrared camera system 4 through 433/315 MHz wireless data receive-and-transmit module 36. The 433/315 MHz wireless data receive-and-transmit module 551 of the infrared camera system 4 transforms the wireless signals from the tablet 3 into serial port signals and transmits the converted signals to the operating module 541 of the infrared camera core unit 54 to conduct, and simultaneously reports to the 433/315 MHz wireless data receive-and-transmit module 36 of the tablet 3 the current state of the core unit 54 through 433/315 MHz wireless data receive-and-transmit module 551. The operating module 541 of the core unit 54 simultaneously converts the digital signals into video signals, and then transmits the converted signals to the 2.4 GHz video (RF) wireless transmitter module 552 of the wireless receive-and-transmit unit 55. In turn, the 2.4 GHz video (RF) wireless transmitter module 552 transforms the CVBS analog signals into wireless video signals and transmits them to the 2.4 GHz multi-frequency analog video (RF) receiver module 37 of the tablet 3 for presentation on the touch screen 10 of the tablet 3.

Figure 6:
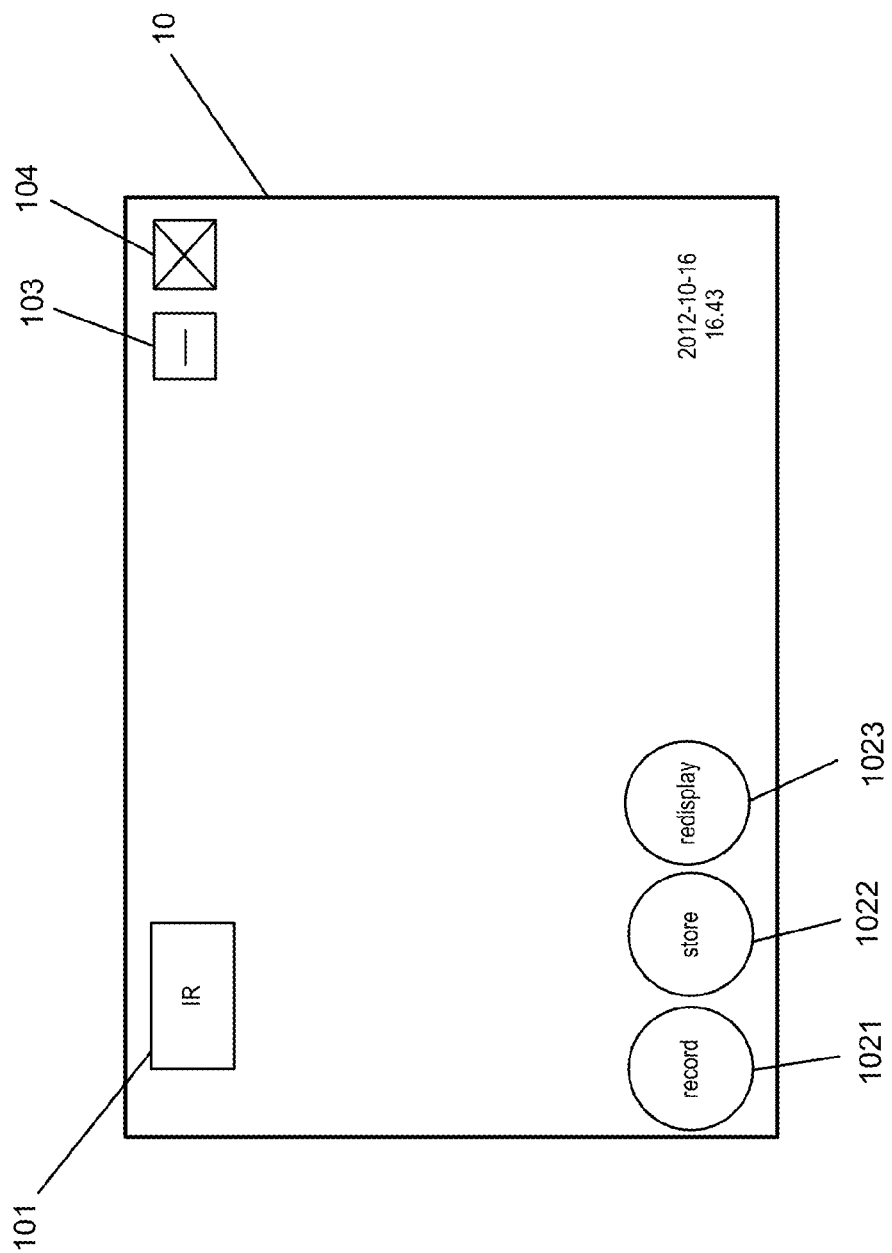
FIG. 6 is a diagram showing an infrared control interface of a tablet according to one embodiment of the present disclosure.

Referring now to FIG. 6, an infrared control interface 101 is fed to the touch screen 10 of the tablet 3. An "IR" button on the left top of the touch screen 10, once being touched, wirelessly apprises the tablet 3 to operate and control the infrared camera system 4 in order to enable the thermal infrared images of the instantaneous road scene to be presented on the touch screen 10. Touching the icon "X" 104 on the right top corner of the touch screen 10 turns the power off.

Figure 7:
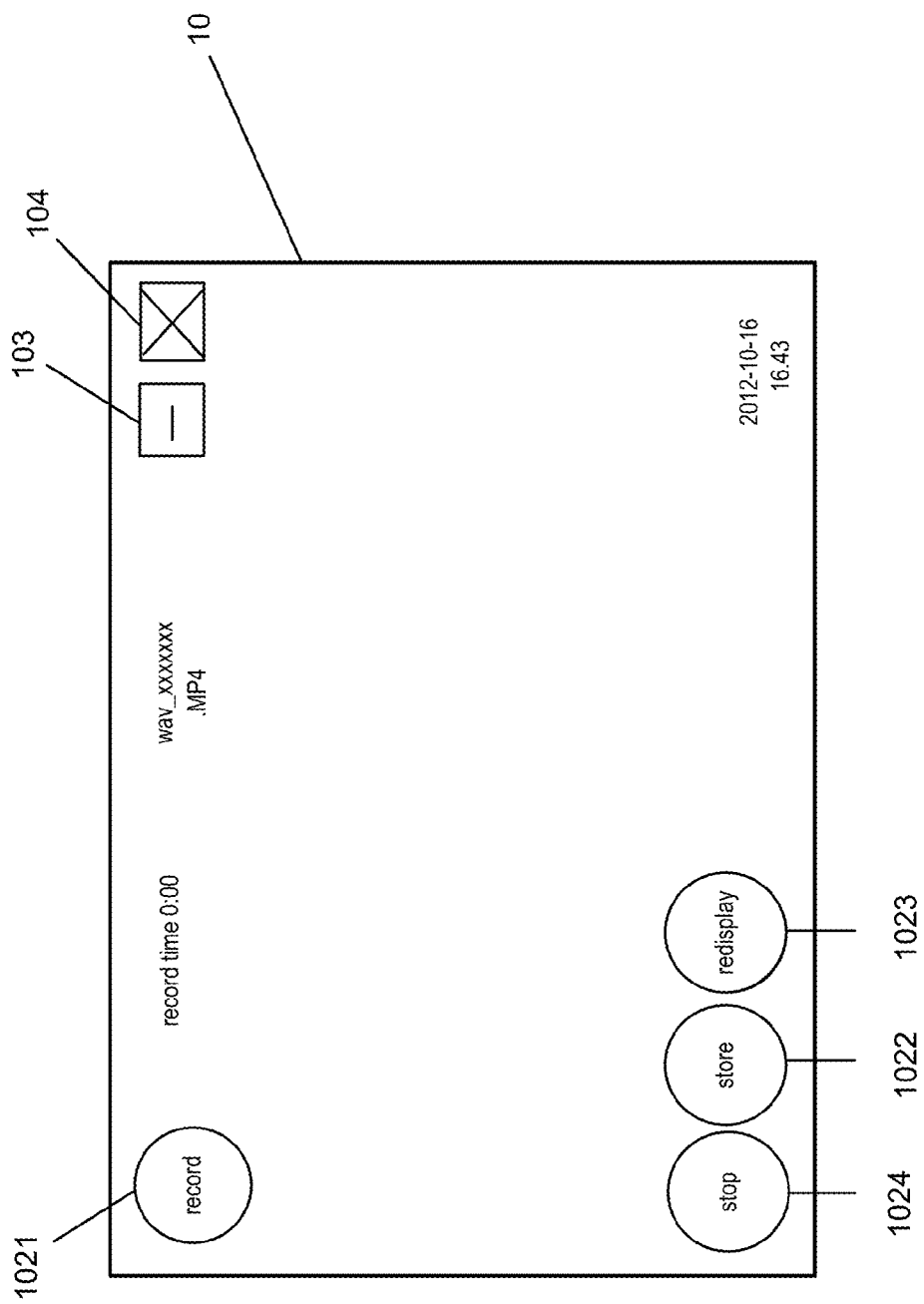
FIG. 7 illustrates a video record/store/redisplay interface of a tablet according to one embodiment of the present disclosure.

FIG. 7 illustrates a video record/store/redisplay interface of the touch screen 10 of the tablet 3. In response to a touch to the record/store/redisplay buttons 1021, 1022, 1023 on the left bottom corner of the touch screen 10 of FIG. 6, a word record 1021 becomes evident on the top left corner (FIG. 7) which indicates that the system of the present disclosure enters into the condition of recording annotation and video. Buttons such as stop button 1024, store button 1022, and redisplay button 1023 simultaneously emerge in a sequence on the left bottom corner, responding actively to one's touch.

Figure 8:
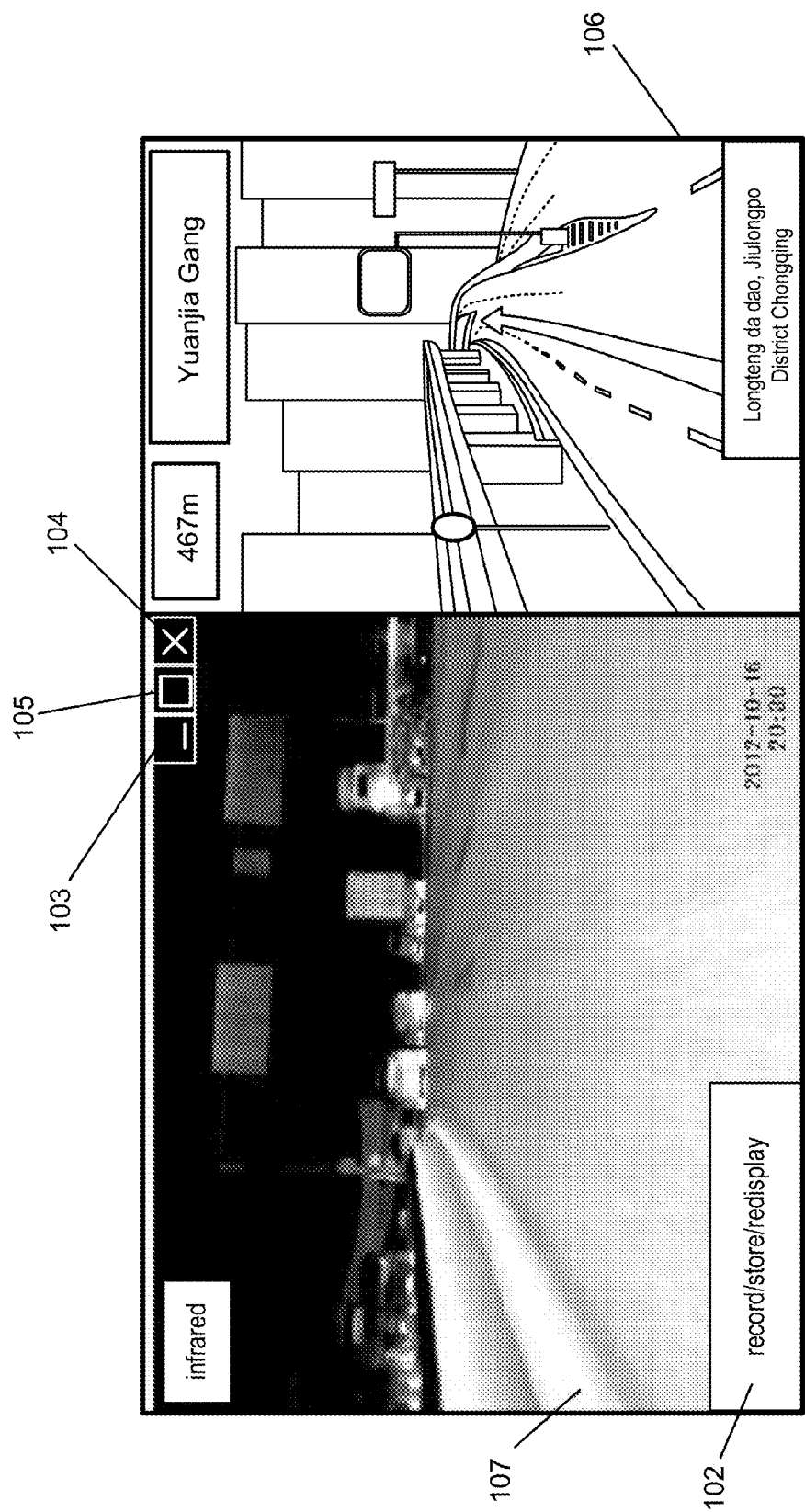
FIG. 8 illustrates is a diagram showing a proportionate split-screen display of an infrared display and a Big Dipper/GPS navigation system of a tablet according to one embodiment of the present disclosure.

FIG. 8 illustrates a split-screen of the touch screen 10 with an infrared image and a Big Dipper/GPS image. In response to a touch to the "-" icon 103 on the top right corner of the touch screen 10 of FIG. 7 when either the infrared image or the Big Dipper/GPS image fills the full screen, the touch screen 10 will be divided proportionately into two parts for instantly displaying the road scene with an infrared image and a Big Dipper/GPS image. For example, in one embodiment of the present disclosure, the split-screen will present the infrared image 107 and the road scene annotation navigation image 106 with a 2:1 proportion, and thereby allow a driver not only to respond to the voice navigation, but also to understand the road scene, which can lead to enhancing the driving direction-orientation as well as improving driving safety. The navigation image 106 includes text "Yuanjia Gang" indicating an example destination and text "Longteng da dao, Jiulongpo District Chongqing" indicating the address for the example destination.

Figure 8A:
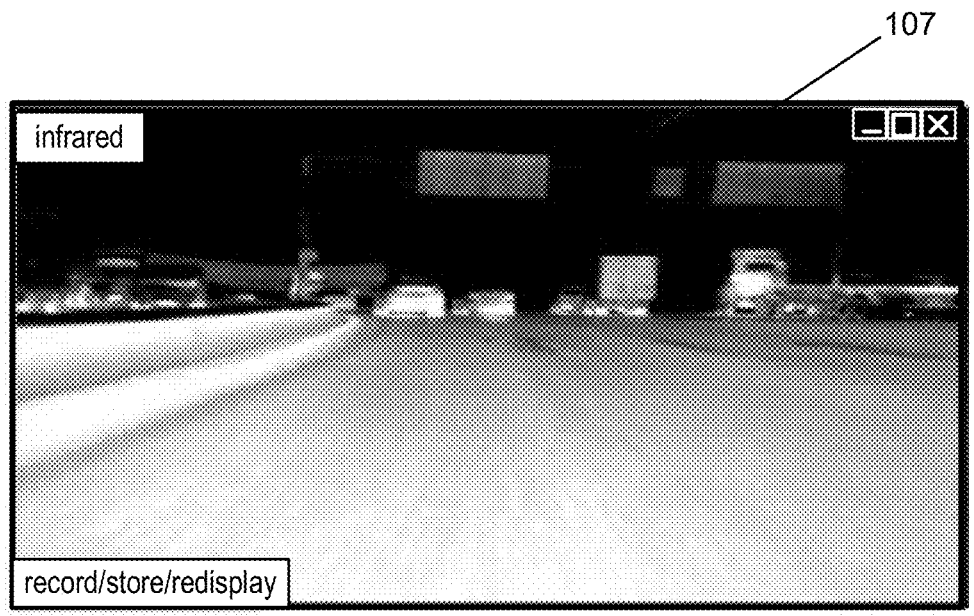
FIGS. 8A and 8B are diagrams showing, respectively, full screen interfaces of either an infrared display or the Big Dipper or GPS navigation system.
Figure 8B:
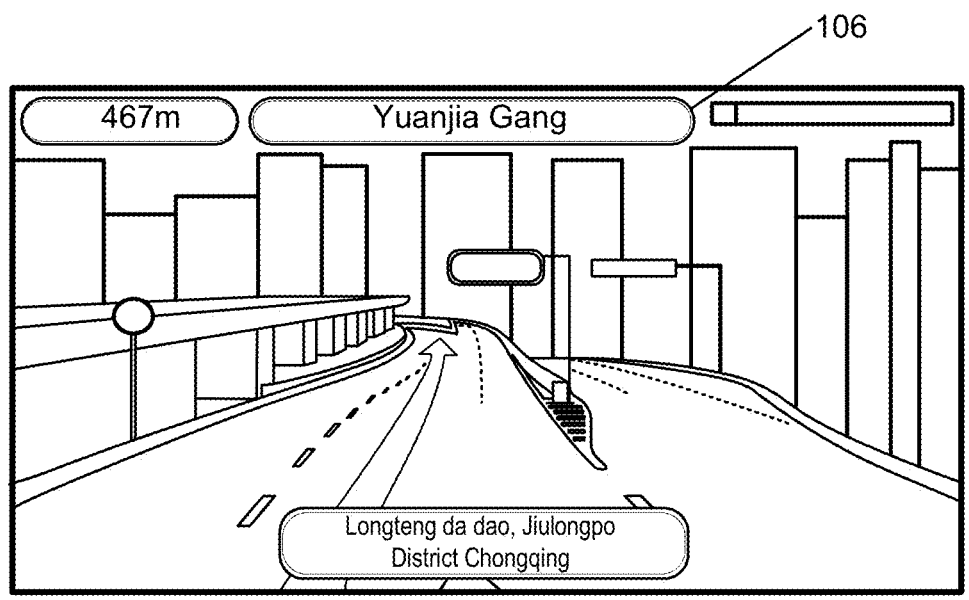

Referring now to the combination of FIG. 8, FIG. 8A, and FIG. 8B, FIG. 8 illustrates the split-screen of the infrared image 107 and the Big Dipper/GPS image 106, while FIG. 8A illustrates a full screen of the infrared image 107 and FIG. 8B illustrates a full screen of a Big Dipper/GPS image 106. In response to a touch to the icon 105 on the top right corner of the touch screen as shown in FIG. 8, the touch screen will change to a full screen presenting either an infrared image 107 or a Big Dipper/GPS image 106.

Figure 9:
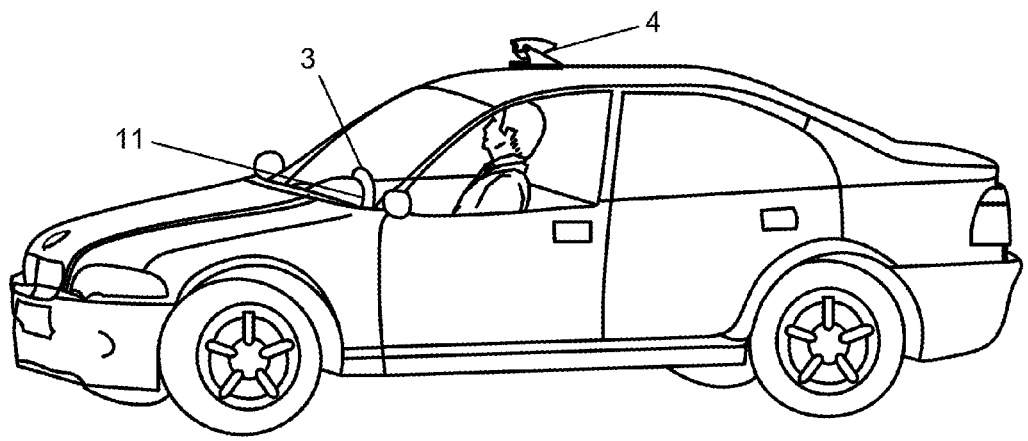
FIG. 9 is a diagram showing positions of an infrared camera system, a tablet, and a suction chuck cage etc. attached to a vehicle according to one embodiment of the present disclosure.

In one embodiment shown in (FIG. 9), the infrared camera system 4 is positioned on the motor vehicle using the magnetic base 8. The tablet 3 is detachably mounted inside the motor vehicle using a suction chuck cage 11. Both the infrared camera system 4 and the tablet 3 are easy to install or uninstall. The tablet 3 can provide functions found in any tablet. In one embodiment, for example, the tablet 3 can provide a telephone voice call function.

Figure 10:
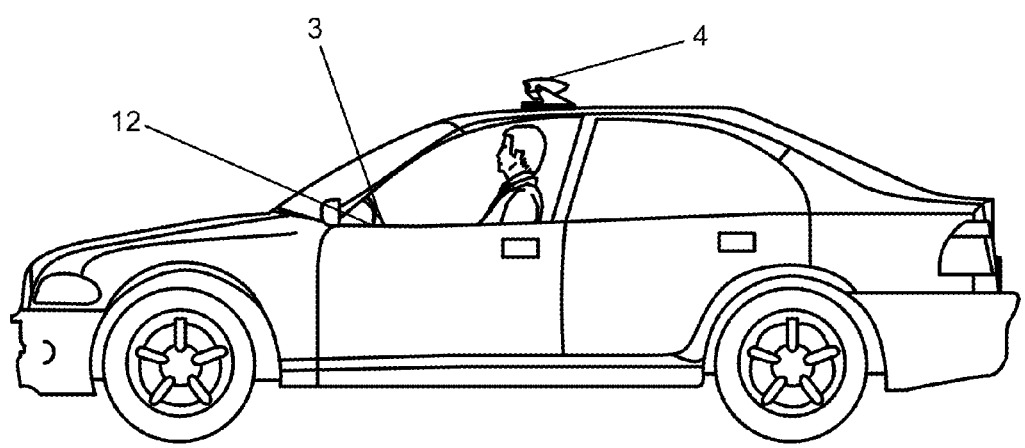
FIG. 10 is a diagram showing positions of an infrared camera system, a tablet, and a skid mount attached to a vehicle according to another embodiment of the present disclosure.

In another embodiment shown in (FIG. 10), the infrared camera system 4 is fixed to the motor vehicle through a magnetic base 8. The tablet 3 is detachably fixed inside the motor vehicle using a skid mount 12. In a similar way, both the infrared camera system 4 and the tablet 3 are easy to install or uninstall. The tablet 3 can provide functions found in any tablet. In one embodiment, for example, the tablet 3 can provide a telephone voice call function.

In the embodiments of the present disclosure as described above, the infrared camera system makes use of a wireless connection to communicate with the tablet so as to facilitate safe driving of the motor vehicle at night. Of course, the embodiments of the present disclosure are not confined to only this description. For example, in another embodiment of the present disclosure, the present system can be utilized in other low-visibility conditions such as in fog or dust, and thereby improve the traffic safety of a motor vehicle.

Although embodiments have been described with reference to a number of illustrative embodiments thereof, it should be understood that numerous other modifications and embodiments can be devised by those skilled in the art and that will fall within the spirit and scope of the principles of these embodiments. More particularly, numerous variations and modifications are possible in the component parts, arrangements, or combinations within the scope of the disclosure, the drawings, and the appended claims. In addition to variations and modifications in the component parts and/or arrangements, alternative uses will also be apparent to those skilled in the art. The scope of the present disclosure should, therefore, be determined only by the following claims.

The invention claimed is:

1. A night driving assistant system using a tablet wirelessly controlling an infrared camera on a motor vehicle, the system comprising:
    an infrared camera system to capture infrared thermal images of a road scene while the motor vehicle is moving and to transmit video signals of the infrared thermal images, the infrared camera system comprising a chassis comprising a housing;
    a magnetic base to detachably fix the infrared camera system to the motor vehicle, the magnetic base connected the chassis of the infrared camera system, the magnetic base comprising a rubber pad and one or more magnets for positioning the infrared camera system on the motor vehicle; and
    a tablet detachably installed inside the motor vehicle, the tablet comprising an intelligent operating system and a Global Positioning System (GPS) navigation system, wherein the infrared camera system wirelessly communicates with the tablet, the tablet configured to receive the video signals transmitted from the infrared camera system and to display the infrared thermal images on a touch screen of a Liquid Crystal Display (LCD), the displayed infrared thermal images including marks indicating recognized human beings and/or animals,
    wherein the housing of the chassis comprises:
        a first bottom face to provide a battery bracket and screw holes, the battery bracket configured for holding a battery which serves as a power source for the infrared camera system, the screw holes configured to receive screws to secure the chassis to the magnetic base;
        a second flat face; and
        a slope cut face, a first side of the inside of a top end of the slope cut face engages a left axis, and a second side of the inside of the top end of the slope cut face engages a right axis.

2. The system according to claim 1, further comprising a suction chuck cage to detachably install the tablet inside the motor vehicle.

3. The system according to claim 1, further comprising a skid mount to detachably install the tablet inside the motor vehicle.

4. The system according to claim 1, wherein the chassis of the infrared camera system further comprises:
    a left buckle;
    a right buckle, and
    a self-locking M16 lamp-equipped water-proof switch positioned to one side of the housing and configured to control a power switch of the infrared camera system.

5. The system according to claim 1, wherein the left axis comprises an M5 axis which is adjacent to the housing of the chassis and connected to the left buckle using screws, the screws attaching the housing of the chassis to an infrared camera the M5 axis comprising:
    an M5 thin nut at an inside of the housing of the chassis; and
    a manual rotating mechanism to secure the infrared camera while it also enables the infrared camera to be rotated manually by a user.

6. The system according to claim 5, wherein the manual rotating mechanism comprises:
    a gasket adjacent to the M5 thin nut;
    a wavy spring on a right side of the gasket, the wavy spring to effectively secure the gear group so as to prevent the infrared camera from unfastening; and
    a gear group on the right of the wavy spring, the gear group comprising a pair of identical gears, a left gear of the gear group connects with the chassis while a right gear connects with a middle part of a shell of the infrared camera, if the infrared camera is manually moved, the left axis and a right axis rotate, but if the infrared camera remains stationary, the gear group serves as a securing mechanism.

7. The system according to claim 1, wherein the right axis comprises a hollow M8 thick axis to connect a core of an infrared camera with a battery unit, the infrared camera utilizes an outside screw thread of the M8 thick axis together with the right buckle to connect the core of the infrared camera and the chassis.

8. The system according to claim 1, wherein the slope cut face has protruding lines on the top of both outsides to facilitate holding of the infrared camera system by enhancing friction of the outsides to thereby avoid a smooth surface enabling the infrared camera to slip down from a user's hands.

9. The system according to claim 1, wherein the infrared camera system comprises an infrared camera fixed to the chassis and configured to capture the infrared thermal images of the road scene while the motor vehicle is moving, and to wirelessly transmit video signals to the tablet for displaying the video on the touch screen, at the same time, the infrared camera receives wireless signals transmitted from the tablet in order to adjust a brightness and gain.

10. The system according to claim 9, wherein the infrared camera is a streamlined design with an elongated egg shape, the infrared camera further comprising:
 a shell mounted on the chassis, the shell including a top part, a middle part, and a bottom part, the top part and the bottom part respectively fixed onto the middle part through screws, the middle part being hollow, the shell comprising a shape configured to mate with the chassis;
 an infrared camera core unit fixed to the front end of the middle part through screws, to receive signals regarding the brightness, gain, human being/animal recognition, and power "on"/"off" instructions from and performs these instructions, and transmits current status information of the core unit back to the tablet to be presented on the touch screen; and
 a wireless receive-and-transmit unit positioned at a rear end of the middle part to achieve wireless communication with the tablet.

11. The system according to claim 10, further comprising a wireless receive-and-transmit unit comprising:
 a 433/315 MHz wireless data receive-and-transmit module to transform a wireless signals from the tablet into serial port signals so as to have the infrared camera core unit perform related instructions and to transmit current status information of the core unit to the tablet through the 433/315 MHz wireless data receive-and-transmit module; and
 a 2.4 GHz video radio frequency (RF) wireless transmitter module built in the infrared camera, to transform the composite video broadcast signal (CVBS) analog signals into wireless video signals and to transmit the wireless video signals to a 2.4 GHz multi-frequency analog video RF wireless receiver module.

12. The system according to claim 11, wherein the infrared camera core unit comprises:
 an operating module used to receive serial port signals transmitted from the 433/315 MHz wireless data receive-and-transmit module of the wireless receive-and-transmit unit, to perform instructions and to transmit the current state of the core to the 433/315 MHz wireless data receive-and-transmit module for presentation on the touch screen of the tablet.

13. The system according to claim 10, wherein the tablet comprises:
 a motherboard located inside the tablet, the motherboard including an intelligent operating system configured to achieve the operation of the infrared camera core using a central processing unit (CPU) of the motherboard, and also configured to achieve functions including adjustment of a brightness/gain of the infrared thermal images, a perception of on/off of the recognition of human being/animal, a record/store/redisplay of the infrared video, and the on/off of the power as well as multi-function processing;
 a 2.4 GHz multi-frequency analog video radio frequency (RF) wireless receiver module located inside the tablet, configured to receive the wireless video signals transmitted from the infrared camera and transform the video signals into analog signals so as to address the interference problem between machines by using multiple frequency points;
 a human being/animal recognizing module positioned inside the tablet, configured to receive the video signals of the infrared thermal images transmitted from the 2.4 GHz multi-frequency analog video (RF) wireless receiver module and process the signals to mark the human being/animal so as to be presented on the touch screen of the tablet; and
 a 433/315 MHz wireless data receive-and-transmit module built inside the tablet, configured to receive wireless signals transmitted from the infrared camera core unit and to transform the signals into serial port signals in order to transmit them to the motherboard, at substantially the same time, the 433/315 MHz wireless data receive-and-transmit module built inside the tablet receives the serial port signals transmitted from the motherboard and transforms the signals into wireless signals in order to transmit them back to the infrared camera core to achieve wireless communication between the tablet and the infrared camera.

14. The system according to claim 13, wherein the tablet further comprises:
 a touch screen configured to display the infrared thermal images, wherein the touch screen is a high-resolution multi-touch capacitive touch screen.

15. The system according to claim 14, wherein the touch screen comprises:
 an infrared control interface configured to enable users to achieve an object of operating the infrared camera core through touching icons presented on the interface so as to record/store/redisplay video and to split the interface into two divided portions with one presenting a current roadway annotation navigation map and another current infrared thermal images of the road scene.

16. The system according to claim 15, wherein the infrared control interface includes icons comprising:
 a power switch icon using the intelligent operating system of the tablet to turn on the power in response to a touch to the power switch icon and then to turn off the power by touching an "X" icon on a top right corner of the touch screen; and
 a record/store/redisplay icon located at a left lower corner of the touch screen, by touching the record/store/redisplay icon, the tablet can record the video and annotation footage of the road scene while the motor vehicle is moving, by retouching the record/store/redisplay icon, a mode enters into a procedure of storing, at any time, a user can touch the record/store/redisplay icon to repeat and listen to a recorded document in order to facilitate post processing.

17. The system according to claim 16, wherein the infrared control interface, through the intelligent operating system, is configured to proportionately display a road scene annotation navigation map and infrared thermal images of the road scene in the form of split-screen.

18. The system according to claim 1, wherein the infrared camera system is configured to be installed and uninstalled without any need to transform the motor vehicle.

19. The system according to claim 1, wherein the tablet is configured to be selectively installed and uninstalled.

20. The system according to claim 1, wherein the tablet further comprises:
a Big Dipper or Global Positioning System (GPS) navigation module integrated in a motherboard configured to display using the touch screen, a navigation map for Big Dipper/GPS, wherein the Big Dipper/GPS map can be displayed in split-screen or in full screen.

21. A night driving assistant system using a tablet wirelessly controlling an infrared camera on a motor vehicle, the system comprising:
an infrared camera system to capture infrared thermal images of a road scene while the motor vehicle is moving and to transmit video signals of the infrared thermal images;
a magnetic base to detachably fix the infrared camera system to the motor vehicle, the magnetic base connected to a chassis of the infrared camera system, the magnetic base comprising a rubber pad and one or more magnets for positioning the infrared camera system on the motor vehicle; and
a tablet detachably installed inside the motor vehicle, the tablet comprising an intelligent operating system and a Global Positioning System (GPS) navigation system, wherein the infrared camera system wirelessly communicates with the tablet, the tablet configured to receive the video signals transmitted from the infrared camera system and to display the infrared thermal images on a touch screen of a Liquid Crystal Display (LCD), the displayed infrared thermal images including marks indicating recognized human beings and/or animals,
wherein the infrared camera system comprises an infrared camera fixed to the chassis and configured to capture the infrared thermal images of the road scene while the motor vehicle is moving, and to wirelessly transmit video signals to the tablet for displaying the video on the touch screen, at the same time, the infrared camera receives wireless signals transmitted from the tablet in order to adjust a brightness and gain, and
wherein the infrared camera is a streamlined design with an elongated egg shape, the infrared camera further comprising:
a shell mounted on the chassis, the shell including a top part, a middle part, and a bottom part, the top part and the bottom part respectively fixed onto the middle part through screws, the middle part being hollow, the shell comprising a shape configured to mate with the chassis;
an infrared camera core unit fixed to the front end of the middle part through screws, to receive signals regarding the brightness, gain, human being/animal recognition and "on"/"off" signals of the power from the tablet and performs these instructions, and transmits current status information of the core unit back to the tablet to be presented on the touch screen; and
a wireless receive-and-transmit unit positioned at a rear end of the middle part to achieve wireless communication with the tablet.

22. The system according to claim 21, further comprising a wireless receive-and-transmit unit comprising:
a 433/315 MHz wireless data receive-and-transmit module to transform a wireless signals from the tablet into serial port signals so as to have the infrared camera core unit perform related instructions and to transmit current status information of the core unit to the tablet through the 433/315 MHz wireless data receive-and-transmit module; and
a 2.4 GHz video radio frequency (RF) wireless transmitter module built in the infrared camera, to transform the composite video broadcast signal (CVBS) analog signals into wireless video signals and to transmit the wireless video signals to a 2.4 GHz multi-frequency analog video RF wireless receiver module.

23. The system according to claim 22, wherein the infrared camera core unit comprises:
an operating module used to receive serial port signals transmitted from the 433/315 MHz wireless data receive-and-transmit module of the wireless receive-and-transmit unit, to perform instructions and to transmit the current state of the core to the 433/315 MHz wireless data receive-and-transmit module for presentation on the touch screen of the tablet.

24. The system according to claim 21, wherein the tablet comprises:
a motherboard located inside the tablet, the motherboard including an intelligent operating system configured to achieve the operation of the infrared camera core using a central processing unit (CPU) of the motherboard, and also configured to achieve functions including adjustment of a brightness/gain of the infrared thermal images, a perception of on/off of the recognition of human being/animal, a record/store/redisplay of the infrared video, and the on/off of the power as well as multi-function processing;
a 2.4 GHz multi-frequency analog video radio frequency (RF) wireless receiver module located inside the tablet, configured to receive the wireless video signals transmitted from the infrared camera and transform the video signals into analog signals so as to address the interference problem between machines by using multiple frequency points;
a human being/animal recognizing module positioned inside the tablet, configured to receive the video signals of the infrared thermal images transmitted from the 2.4 GHz multi-frequency analog video (RF) wireless receiver module and process the signals to mark the human being/animal so as to be presented on the touch screen of the tablet; and
a 433/315 MHz wireless data receive-and-transmit module built inside the tablet, configured to receive wireless signals transmitted from the infrared camera core unit and to transform the signals into serial port signals in order to transmit them to the motherboard, at substantially the same time, the 433/315 MHz wireless data receive-and-transmit module built inside the tablet receives the serial port signals transmitted from the motherboard and transforms the signals into wireless signals in order to transmit them back to the infrared camera core to achieve wireless communication between the tablet and the infrared camera.

25. The system according to claim 24, wherein the tablet further comprises:
a touch screen configured to display the infrared thermal images, wherein the touch screen is a high-resolution multi-touch capacitive touch screen.

26. The system according to claim 25, wherein the touch screen comprises:
an infrared control interface configured to enable users to achieve an object of operating the infrared camera core through touching icons presented on the interface so as to record/store/redisplay video and to split the interface into two divided portions with one presenting a current roadway annotation navigation map and another current infrared thermal images of the road scene.

27. The system according to claim 26, wherein the infrared control interface includes icons comprising:
> a power switch icon using the intelligent operating system of the tablet to turn on the power in response to a touch to the power switch icon and then to turn off the power by touching an "X" icon on a top right corner of the touch screen; and
>
> a record/store/redisplay icon located at a left lower corner of the touch screen, by touching the record/store/redisplay icon, the tablet can record the video and annotation footage of the road scene while the motor vehicle is moving, by retouching the record/store/redisplay icon, a mode enters into a procedure of storing, at any time, a user can touch the record/store/redisplay icon to repeat and listen to a recorded document in order to facilitate post processing.

28. The system according to claim 26, wherein the infrared control interface, through the intelligent operating system, is configured to proportionately display a road scene annotation navigation map and infrared thermal images of the road scene in the form of split-screen.

\* \* \* \* \*